(12) United States Patent
Clark (10) Patent No.: US 7,765,806 B2
(45) Date of Patent: Aug. 3, 2010

(54) ATKINSON CYCLE POWERTRAIN

(75) Inventor: Roger A. Clark, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 415 days.

(21) Appl. No.: 11/839,039

(22) Filed: Aug. 15, 2007

(65) Prior Publication Data

US 2008/0041323 A1 Feb. 21, 2008

Related U.S. Application Data

(60) Provisional application No. 60/823,015, filed on Aug. 21, 2006.

(51) Int. Cl.
*F02B 33/44* (2006.01)
*F02B 33/00* (2006.01)
*F01L 1/34* (2006.01)

(52) U.S. Cl. .................... 60/608; 60/607; 60/609; 123/559.3; 123/90.17

(58) Field of Classification Search ........... 60/607–609, 60/605.1; 123/559.1–559.3, 90.06, 90.15, 123/90.17; 477/2, 5
See application file for complete search history.

(56) References Cited

U.S. PATENT DOCUMENTS

| 2,292,233 | A | * | 8/1942 | Lysholm ................... 123/559.1 |
| 3,595,013 | A | * | 7/1971 | Brille et al. .................... 60/609 |
| 4,424,790 | A | * | 1/1984 | Curtil ...................... 123/559.1 |
| 4,815,423 | A | * | 3/1989 | Holmer ...................... 123/90.6 |
| 5,341,771 | A | * | 8/1994 | Riley ......................... 123/316 |
| 6,125,801 | A | * | 10/2000 | Mendler .................. 123/90.15 |
| 6,443,125 | B1 | * | 9/2002 | Mendler ...................... 123/316 |
| 6,832,148 | B1 | * | 12/2004 | Bennett et al. ................. 477/2 |
| 6,931,850 | B2 | * | 8/2005 | Frank et al. .................... 60/608 |
| 7,022,038 | B2 | * | 4/2006 | Schmidt et al. ................. 475/5 |
| 7,076,954 | B1 | * | 7/2006 | Sopko et al. ................... 60/608 |
| 7,415,966 | B2 | * | 8/2008 | Irisawa ....................... 123/431 |
| 2004/0194748 | A1 | * | 10/2004 | Asai et al. ................ 123/90.17 |
| 2007/0144175 | A1 | * | 6/2007 | Sopko et al. ............... 60/605.1 |

(Continued)

FOREIGN PATENT DOCUMENTS

AU       2006225337 A1 *   5/2008

(Continued)

OTHER PUBLICATIONS

Cam Phase Actuation Rate Performance Impact on Fuel Consumption and NOx Emissions Over the FTP-75 Drive Cycle, Jacquelin, Frederic; Burk, Reinhard; Wakeman, Russell, SAE-2003-01-0023, Society of Automotive Engineers, Warrendale, PA, 2003.

(Continued)

*Primary Examiner*—Thai Ba Trieu
(74) *Attorney, Agent, or Firm*—Quinn Law Group, PLLC (57) ABSTRACT

A powertrain includes an Atkinson cycle engine having at least one cylinder, a crankshaft, and an air intake system that provides selective fluid communication between the at least one cylinder and the atmosphere. A motor is in hybrid combination with the engine, and a compressor is configured to selectively pressurize air in the air intake system. The powertrain provides the fuel efficiency of an Atkinson cycle engine while compensating for the reduced torque output of an Atkinson cycle engine.

13 Claims, 4 Drawing Sheets

U.S. PATENT DOCUMENTS

| | | | |
|---|---|---|---|
| 2007/0295290 A1* | 12/2007 | Cao | 123/64 |
| 2008/0121218 A1* | 5/2008 | Algrain | 60/605.1 |
| 2009/0031999 A1* | 2/2009 | Erickson | 123/563 |
| 2009/0064974 A1* | 3/2009 | Casal Kulzer | 123/559.1 |

FOREIGN PATENT DOCUMENTS

| | | | |
|---|---|---|---|
| EP | 1291507 A2 * | 3/2003 | |
| EP | 1424474 A1 * | 6/2004 | |
| EP | 1754872 A1 * | 2/2007 | |

OTHER PUBLICATIONS

First and Second Law Analyses of a Naturally-Aspirated, Miller Cycle, SI Engine with Late Intake Valve Closure, Anderson, Michael K.; Assanis, Dennis N.; Filipi, Zoran S., SAE 980889, Society of Automotive Engineers, Warrendale, PA, 1998.

The Otto-Atkinson Cycle Engine-Fuel Economy and Emissions Results and Hardware Design, Boggs,D. L.; Hilbert, H.S.; Schechter, M.M., SAE 950089, Society of Automotive Engineers, Warrendale, PA, 1995.

Development of a Late Intake-Valve Closing (LIVC) Miller cycle for Stationary Natural Gas Engines—Effect of EGR Utilization, Okamoto, Kazuhisa; Zhang, Fu-Rong; Shimogata, Satoshi; Shoji, Fujio, SAE 972948, Society of Automotive Engineers, Warrendale, PA, 1997.

Toyota Hybrid System THS II, Toyota Motor Corporation, Public Affairs Division, Tokyo, Japan, May 2003.

Turbocharging Surprise—Improved Performance Better Fuel Economy Lower Costs, Shahed, S. M.; Milliken, Doug; Roffelsen, Diane; Poirier, Jean-Noel; Middlemass, Chris; Conroy, Paul, SAE Detroit Section, Nov. 5, 2003.

* cited by examiner

ATKINSON CYCLE POWERTRAIN

CROSS REFERENCE TO RELATED APPLICATIONS

This application claims the benefit of U.S. Provisional Patent Application No. 60/823,015, filed Aug. 21, 2006, and which is hereby incorporated by reference in its entirety.

TECHNICAL FIELD

This invention relates to powertrains having an Atkinson cycle engine with an air intake system, a motor in hybrid combination with the engine, and a selectively actuatable compressor configured to pressurize air in the intake system.

BACKGROUND OF THE INVENTION

A spark ignition internal combustion engine for vehicular use is typically characterized by a four-stroke cycle of operation. Each piston of the engine reciprocally translates within a respective cylinder between a top dead center position and a bottom dead center position, as understood by those skilled in the art. During an intake stroke, the piston moves from its top dead center position to its bottom dead center position, thereby drawing air and fuel into the cylinder through an open intake valve. During a subsequent compression stroke, the piston moves from its bottom dead center position to its top dead center position, thereby compressing the air and fuel.

A spark plug generates a spark, causing the air and fuel in the cylinder to combust when the piston is at or near top dead center, generating pressure and forcing the piston to its bottom dead center position during an expansion stroke. After the expansion stroke, the piston returns to its top dead center position during an exhaust stroke, thereby forcing the exhaust gases out of the cylinder through an opened exhaust valve. In the Otto cycle, the pressure in the cylinder is higher than the exhaust manifold pressure at the time the exhaust valve is opened, and thus some of the energy produced by the combustion of the air and fuel is lost through the exhaust rather than transferred to the crankshaft via the piston.

An engine operating in the Atkinson cycle is characterized by significantly higher efficiency than an engine operating in the Otto cycle because the Atkinson cycle permits more expansion of the combustion gases prior to the opening of the exhaust valve, e.g., the pressure in the cylinder may be equal to the pressure in the exhaust manifold or atmospheric pressure when the exhaust valve is opened. However, the Atkinson cycle is characterized by a lower indicated mean effective pressure (IMEP), power density, and peak power than the Otto cycle.

SUMMARY OF THE INVENTION

A powertrain is provided that includes an Atkinson cycle engine having at least one cylinder, a selectively rotatable crankshaft, and an air intake system that provides selective fluid communication between the cylinder and the atmosphere. The powertrain also includes a motor in hybrid combination with the engine, a compressor, a power source, and a controller. The compressor is configured to selectively compress air in the air intake system and has a selectively rotatable rotor. The power source is operatively connected to the rotor and is configured to selectively transmit power to the rotor. The controller is operatively connected to the compressor and is configured to selectively cause the powertrain to operate in a first mode of operation and a second mode of operation. In the first mode of operation, the crankshaft rotates and the power source does not transmit power to the rotor. In the second mode of operation, the crankshaft rotates and the power source transmits power to the rotor.

The powertrain provided herein takes advantage of the efficiency of the Atkinson cycle, while compensating for the Atkinson cycle's low IMEP, power density, and peak power. During the first mode of operation, the Atkinson cycle engine provides efficiency, but with low power density and low peak power. When commanded torque exceeds the maximum torque available from the engine, the motor in hybrid combination with the Atkinson cycle engine may provide additional torque. However, sustained usage of the motor may deplete the energy of the battery that powers the motor. During the second mode of operation, the compressor increases the torque output of the engine without draining the battery that powers the motor. Accordingly, the compressor may be activated to increase the torque output of the engine, without draining the battery, for prolonged periods during which the commanded torque exceeds the maximum torque of the normally-aspirated Atkinson cycle engine. The compressor does not draw power from the engine or other power source during the first mode, and thus the compressor does not cause parasitic loss during the first mode.

A method of operating a powertrain is also provided. The method includes operating the powertrain in a first mode by causing an Atkinson cycle engine and an electric motor to simultaneously transmit torque to an output member, operating the powertrain in a second mode by causing the Atkinson cycle engine to transmit torque to the output member and simultaneously causing a compressor to pressurize air in an air intake system of the engine, and operating the powertrain to operate in a third mode by causing the Atkinson cycle engine to transmit torque to the output member with the motor and the compressor deactivated.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
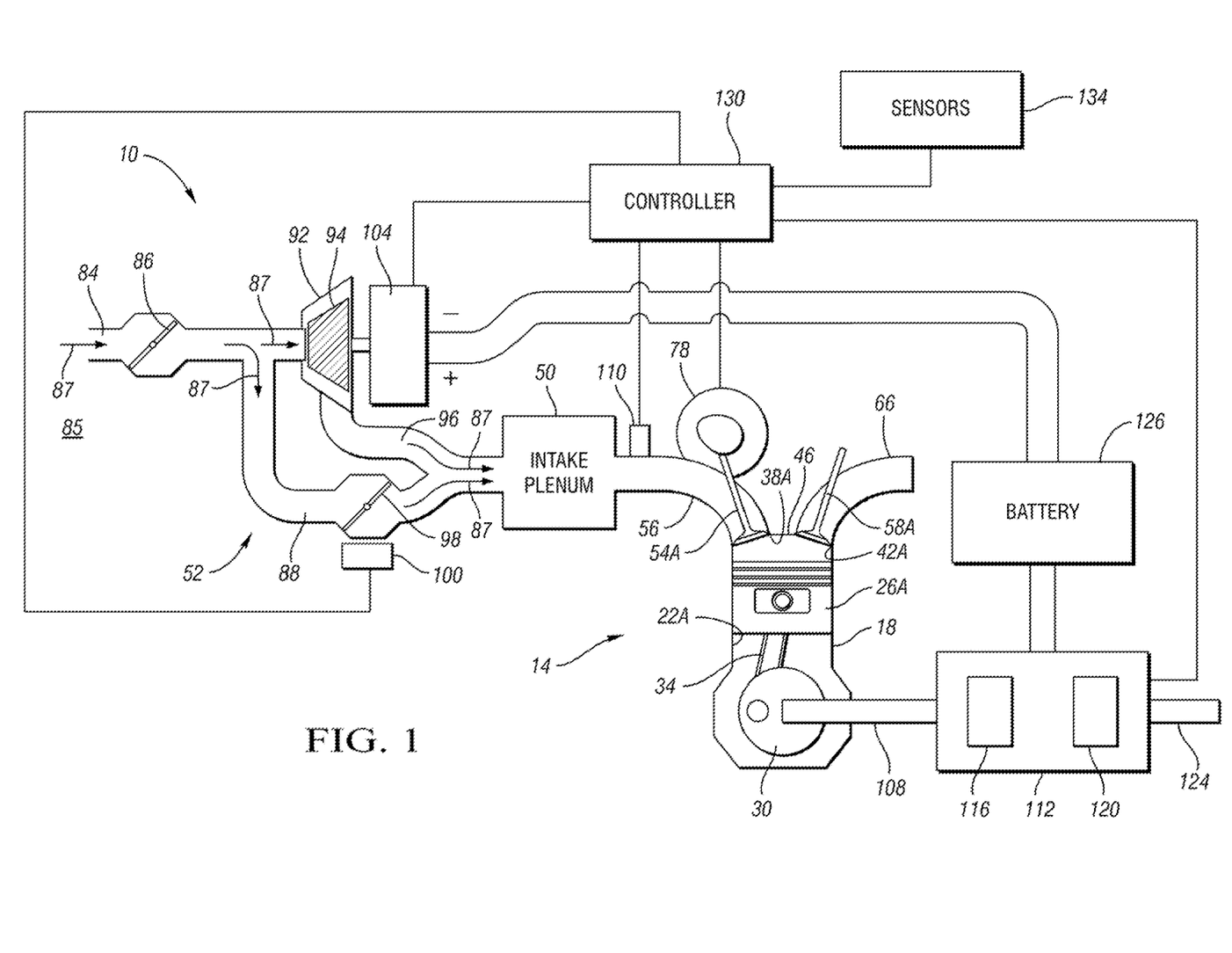
FIG. 1 is a schematic depiction of a powertrain including an engine and a transmission.
Figure 1A:
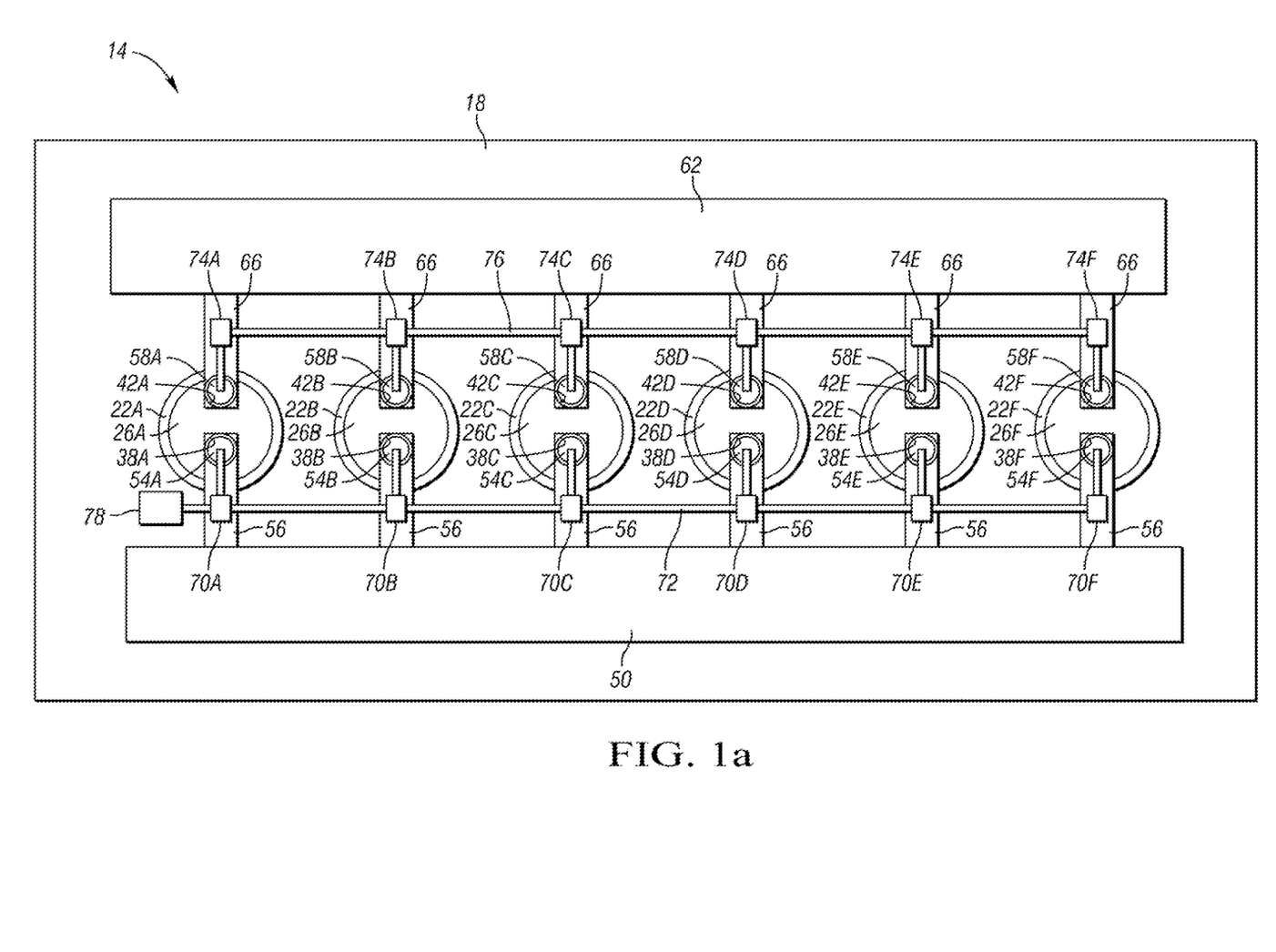
FIG. 1a is a schematic top view of the engine of FIG. 1.

Referring to FIG. 1, a vehicle powertrain 10 is schematically depicted. The powertrain 10 includes an internal combustion engine 14. Referring to FIGS. 1 and 1a, the engine 14 includes an engine block 18 defining a plurality of cylinders 22A-F. The engine 14 further includes a plurality of pistons 26A-F. Each piston 26A-F is positioned within a respective one of the cylinders 22A-F for reciprocal translation therein between a top dead center position and a bottom dead center position, as understood by those skilled in the art.

Each piston 26A-F is operatively connected to a crankshaft (shown at 30 in FIG. 1) via a respective connecting rod (shown at 34 in FIG. 1) such that the reciprocal translation of each piston causes rotation of the crankshaft 30 and vice versa. Each cylinder 22A-F includes a respective intake port 38A-F, and a respective exhaust port 42A-F formed by a cylinder head (shown at 46 in FIG. 1). Each intake port 38A-F is in selective fluid communication with an intake plenum 50 of an air intake system 52 via a respective runner 56 to receive an intake charge including air, fuel, and, optionally, recirculated exhaust gas. Each exhaust port 42A-F is in selective fluid communication with an exhaust manifold 62 via a respective runner 66, as understood by those skilled in the art.

Each cylinder 22A-F has a respective intake valve 54A-F associated therewith. Each intake valve 54A-F is movable between an open position in which the cylinder associated with the intake valve is in fluid communication with the plenum 50 via its respective intake port 38A-F, and a closed position in which the intake valve 54A-F obstructs a respective one of the intake ports 38A-F thereby to prevent fluid communication between the cylinder 22A-F associated with the intake valve and the air intake system 52. Similarly, each cylinder 22A-F has a respective exhaust valve 58A-F associated therewith. Each exhaust valve 58A-F is movable between an open position in which the cylinder associated with the exhaust valve is in fluid communication with the exhaust manifold 62 via its respective exhaust port 42A-F, and a closed position in which the exhaust valve 58A-F obstructs a respective one of the exhaust ports 42A-F thereby to prevent fluid communication between the cylinder 22A-F associated with the exhaust valve and the exhaust manifold 62.

The intake valves 54A-F are spring-biased in the closed position. The engine 14 includes intake valve actuators 70A-F, each of the intake valve actuators being configured to selectively cause a respective one of the intake valves 54A-F to move between its open and closed positions. In the embodiment depicted, the actuators 70A-F operatively engage a camshaft 72, which is operatively connected to the crankshaft 30 to be driven thereby, such as via a belt drive (not shown), as understood by those skilled in the art. The exhaust valves 58A-F are also spring-biased in the closed position. The engine 14 includes exhaust valve actuators 74A-F, each being configured to selectively cause a respective one of the exhaust valves 58A-F to move between its open and closed positions. Actuators 74A-F operatively engage a camshaft 76, which is operatively connected to the crankshaft 30 to be driven thereby, such as via a belt drive (not shown), as understood by those skilled in the art. Alternatively, and within the scope of the claimed invention, the intake and exhaust valve actuators may operatively engage a common camshaft. Those skilled in the art will recognize a variety of valve actuators that may be employed within the scope of the claimed invention, such as cam-operated rocker arms, cam-operated finger followers, solenoids, etc.

In the embodiment depicted, actuators 70A, 70C, and 70E are standard actuators that open and close intake valves 54A, 54C, and 54E once during every two rotations of the crankshaft. Similarly, actuators 74A, 74C, and 74E are standard actuators that open and close exhaust valves 58A, 58C, and 58E once during every two rotations of the crankshaft.

The engine 14 is characterized by Displacement on Demand, wherein certain intake and exhaust valves are selectively deactivatable to render certain engine cylinders inoperative. In the embodiment depicted, valve actuators 70B, 70D, 70F, 74B, 74D, 74F are controllable to selectively activate and deactivate valves 54B, 54D, 54F, 58B, 58D, 58F, respectively. Intake valves 54B, 54D, 54F and exhaust valves 58B, 58D, 58F open and close once during every two rotations of the crankshaft when activated; intake valves 54B, 54D, 54F and exhaust valves 58B, 58D, 58F are selectively deactivatable to render cylinders 22B, 22D, and 22F inoperative. When the intake valves 54B, 54D, 54F and the exhaust valves 58B, 58D, and 58F are deactivated, they remain closed irrespective of crankshaft rotation. Those skilled in the art will recognize various valve actuator configurations that enable selective valve deactivation. In an exemplary embodiment not shown, all intake and exhaust valves are selectively deactivatable.

The engine 14 operates on an Atkinson cycle. In the embodiment depicted, the engine 14 is characterized by very late intake valve closing to achieve the Atkinson cycle of operation. Intake valves 54A, 54C, 54E, and intake valves 54B, 54D, 54F when activated, close between 60-150 crank angle degrees after bottom dead center following an intake stroke. That is, each intake valve 54A-F closes between 70 and 150 crank angle degrees after the piston 26A-F in the cylinder 22A-F that is associated with the intake valve is at its respective bottom dead center position. If the crank angle between exhaust valve opening and bottom dead center during the expansion stroke of the piston is less than the crank angle between bottom dead center and intake valve closing during the compression stroke of the piston, then the actual volumetric expansion ratio is greater than the actual volumetric compression ratio.

The exhaust valves 58A-F are characterized by late opening, e.g., approximately 30-35 crank angle degrees before bottom dead center. The Atkinson cycle increases the indicated output power for a given fuel input compared to the Otto cycle because the Atkinson cycle enables a greater expansion of the gasses in the cylinders during the power stroke compared to the Otto cycle. Furthermore, late intake valve closing reduces pumping work compared to an Otto cycle engine because air and fuel is forced out the inlet ports during each piston's compression stroke, thereby increasing manifold pressure, i.e., pressure in the plenum 50 at any engine output torque level.

In an exemplary embodiment, each cylinder 22A-F is characterized by a high geometric compression ratio, preferably between 11:1 and 16:1. The late intake valve closing results in some of the air drawn into the cylinders during the intake stroke being forced back into the air intake system 52 during the compression stroke of the piston, thereby resulting in an effective compression ratio that is less than the geometric compression ratio.

In an exemplary embodiment, the effective compression ratio is between approximately 8:1 and 11:1 with intake valve closure at 80 crank angle degrees after bottom dead center, depending on the geometric compression ratio, thereby providing a power stroke expansion to compression ratio of between 1.0 and 2.0. Thus, the late intake valve closing enables the engine 14 to operate without abnormal combustion (knock), but with a very high expansion ratio that results in increased output energy per unit of fuel consumed. With intake valve closure at 120 crank angle degrees after bottom dead center, the effective compression ratio is approximately 3.5:1, with a power stroke expansion to compression ratio of greater than 3.5, and full power stroke expansion to atmospheric pressure. At this position the engine 14 pumps less than one third of the baseline airflow at a given speed and manifold air pressure.

The engine 14 also includes a cam phaser 78 that is operatively connected to the intake valve actuators 70A-F via the camshaft 72 and configured to selectively vary the crank angle at which the intake valves 54A-F close.

The air intake system 52 defines a first passageway 84 that is in fluid communication with the atmosphere 85 to receive air therefrom. The air intake system 52 preferably includes an air filter (not shown) upstream of the first passageway 84. A throttle valve 86 in the first passageway 84 controls the amount of air 87 drawn into the air intake system 52, as understood by those skilled in the art. The air intake system 52 defines a second passageway 88 that provides fluid communication between the intake plenum 50 and the first passageway 84. A compressor 92 is in fluid communication with the first passageway 84. The compressor 92 includes a selectively rotatable rotor 94, as understood by those skilled in the art. The air intake system 52 defines a third passageway 96 that provides fluid communication between the intake plenum 50 and the compressor 92. A bypass valve 98 is movable between a closed position in which the valve 98 obstructs the second passageway 88 thereby to prevent air flow from the first passageway 84 to the intake plenum 50 through the second passageway 88, and an open position in which the valve 98 permits air flow from the first passageway 84 to the plenum 50 through the second passageway 88. An actuator 100, such as a solenoid or servomotor, is operatively connected to the valve 98 and configured to selectively move the valve 98 between its open and closed positions.

The compressor 92 is configured to selectively pressurize air 87 from the first passageway 84 and transmit the pressurized air into the third passageway 96, and, accordingly, to the intake plenum 50 and the cylinders 22A-F. The powertrain 10 includes a power source for the compressor 92. In the embodiment depicted, the power source is an electric motor 104 that is operatively connected to the compressor 92 to selectively power the compressor 92. More specifically, the motor 104 is configured to selectively rotate the rotor 94, thereby to pressurize air 87 in the third passageway 96. The motor 104 and the compressor 92 form an "electrical supercharger" or an "electrically powered supercharger."

The engine 14 includes at least one fuel injector 110 configured to supply fuel to the cylinders 22A-F. In the embodiment depicted, fuel injector 110 is operatively connected to the air intake system 52 to inject fuel into air upstream of the cylinders 22A-F. The powertrain 10 also includes a controller 130. Within the scope of the claimed invention, a controller may include one controller or a plurality of controllers that operate together to perform the logical operations and controls described herein. For example, the controller 130 may comprise an engine controller and a transmission controller. In the preferred embodiment, the controller 130 is a digital controller. The controller may be programmable to perform the logical operations and controls described herein, or may include circuits dedicated to perform the logical operations and controls described herein.

The crankshaft 30 is operatively connected to the input member 108 of an electrically variable transmission 112 to transmit rotary power and torque thereto. Those skilled in the art will recognize and understand the construction and operation of an electrically variable transmission. The electrically variable transmission 112 includes a first motor/generator 116 and a second motor/generator 120. The speed ratio between the input member 108 and the output member 124 of the transmission 112 is proportional to the speed of one or both of the motor/generators 116, 120, and therefore the speed ratio is continuously variable by varying the speed of one or both of the motor/generators 116, 120.

Each motor/generator 116, 120 is operatively connected to an electrical energy storage device, such as battery 126, to receive electrical energy therefrom when operating as a motor, or to transmit electrical energy thereto when operating as a generator. The transmission 112 results in the powertrain 10 being a hybrid-electric powertrain because the motor/generators 116, 120 can be operated to supplement the power and torque output of the engine 14 to the transmission output member 124 using electrical energy from battery 126, and the motor/generators 116, 120 can convert mechanical energy from the engine 14 to electrical energy, which is then stored as chemical energy in the battery 126 for later use by the motor/generators 116, 120, as understood by those skilled in the art, and for use by motor 104 to drive the compressor 92.

Figure 2:
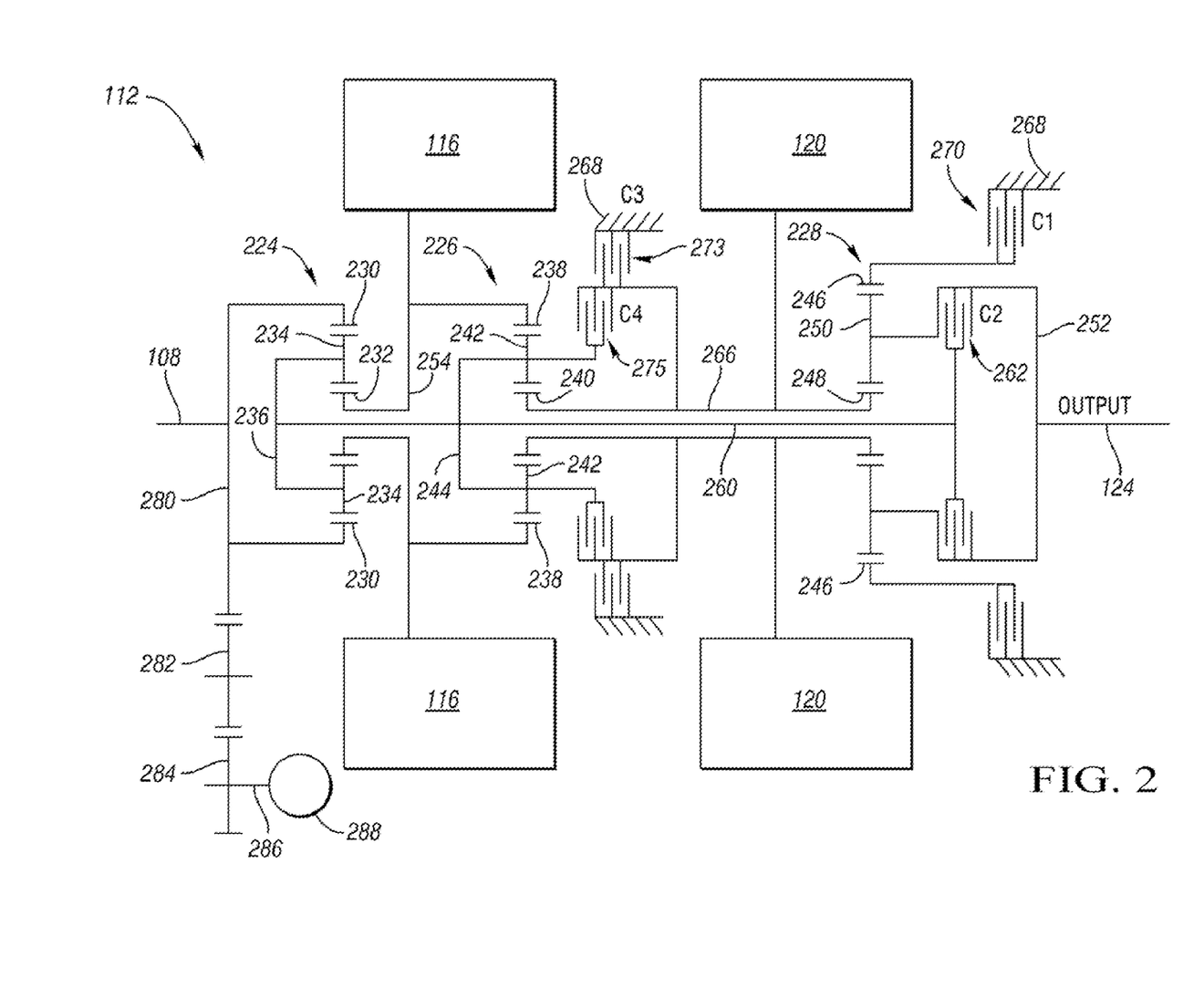
FIG. 2 is a schematic representation of the transmission of FIG. 1.

Referring to FIG. 2, wherein like reference numbers refer to like components from FIGS. 1 and 1a, the transmission 112 is schematically depicted. The transmission 112 is a two-mode, compound-split electromechanical transmission. The input member 108 may be directly connected to the crankshaft or other engine output member, or may be selectively connectable to the crankshaft via a selectively engageable torque transmitting device or a hydrodynamic torque convertor. It may be desirable to include a transient torque damper between the crankshaft 30 and the transmission input member 108. The input member 108 is connected to a planetary gear set 224 in the transmission 112.

The transmission 112 utilizes three planetary gear sets 224, 226 and 228. The first planetary gear set 224 has an outer gear member 230, which may generally be designated as the ring gear, which circumscribes an inner gear member 232, generally designated as the sun gear. A plurality of planet gear members 234 are rotatably mounted on a carrier 236 such that each planet gear member 234 meshingly engages both the outer gear member 230 and the inner gear member 232.

The second planetary gear set 226 also has an outer gear member 238, generally designated as the ring gear, which circumscribes an inner gear member 240, generally designated as the sun gear. A plurality of planet gear members 242 are rotatably mounted on a carrier 244 such that each planet gear 242 meshingly engages both the outer gear member 238 and the inner gear member 240.

The third planetary gear set 228 also has an outer gear member 246, generally designated as the ring gear, which circumscribes an inner gear member 248, generally designated as the sun gear. A plurality of planet gear members 250 are rotatably mounted on a carrier 252 such that each planet gear 250 meshingly engages both the outer gear member 246 and the inner gear member 248.

In an exemplary embodiment, the ring gear/sun gear tooth ratio of the planetary gear set 224 is 65/33; the ring gear/sun gear tooth ratio of the planetary gear set 226 is 65/33; and the ring gear/sun gear tooth ratio of the planetary gear set 228 is 94/34.

While all three planetary gear sets 224, 226 and 228 are "simple" planetary gear sets in their own right, the first and second planetary gear sets 224 and 226 are compounded in that the inner gear member 232 of the first planetary gear set 224 is conjoined, as through a hub plate gear 254, to the outer gear member 238 of the second planetary gear set 226. The conjoined inner gear member 232 of the first planetary gear set 224 and the outer gear member 238 of the second planetary gear set 226 are continuously connected to the first motor/generator 116.

The planetary gear sets 224 and 226 are further compounded in that the carrier 236 of the first planetary gear set 224 is conjoined, as through a shaft 260, to the carrier 244 of the second planetary gear set 226. As such, carriers 236 and 244 of the first and second planetary gear sets 224 and 226, respectively, are conjoined. The shaft 260 is also selectively connected to the carrier 252 of the third planetary gear set 228, as through a torque-transmitting mechanism 262.

The carrier 252 of the third planetary gear set 228 is connected directly to the transmission output member 124. The output member 124 may be connected to the vehicular axles (not shown) that may, in turn, terminate in the drive members (also not shown), such as front or rear wheels of the vehicle.

The inner gear member 240 of the second planetary gear set 226 is connected to the inner gear member 248 of the third planetary gear set 228, as through a sleeve shaft 266 that circumscribes shaft 260. The outer gear member 246 of the third planetary gear set 228 is selectively connected to ground, represented by the transmission housing 268, through a torque-transmitting mechanism 270. The sleeve shaft 266 is also continuously connected to the second motor/generator 120. All the planetary gear sets 224, 226 and 228 as well as the two motor/generators 116 and 120 are coaxially oriented, about the axially disposed shaft 260. It should be noted that both motor/generators 116 and 120 are of an annular configuration which permits them to circumscribe the three planetary gear sets 224, 226 and 228 such that the planetary gear sets 224, 226 and 228 are disposed radially inwardly of the motor/generators 116 and 120. This configuration assures that the overall envelope—i.e.: the circumferential dimension—of the transmission 112 is minimized.

A torque-transmitting mechanism 273 selectively connects the sun gear 240 with ground (i.e.: with transmission housing 268). A torque-transmitting mechanism 275 is operative as a lock-up clutch, locking planetary gear sets 224, 226, motors 116, 120 and the input to rotate as a group, by selectively connecting the sun gear 240 with the carrier 244. The torque-transmitting mechanisms 262, 270, 273, 275 are all friction clutches.

A drive gear 280 may be presented from the input member 108. As depicted, the drive gear 280 fixedly connects the input member 108 to the outer gear member 230 of the first planetary gear set 224, and the drive gear 280, therefore, receives power from the engine 14 and/or the motor/generators 116 and/or 120. The drive gear 280 meshingly engages an idler gear 282 which, in turn, meshingly engages a transfer gear 284 that is secured to one end of a shaft 286. The other end of the shaft 286 may be secured to a transmission fluid pump and/or PTO unit, designated either individually or collectively at 288.

The controller (shown at 130 in FIG. 1) is operatively connected to the transmission 112 to control the transmission 112 in response to operator demand, which the controller 130 determines based on various inputs such as the position of an accelerator pedal, brake pedal, etc., as understood by those skilled in the art. More particularly, the controller 130 controls the motor/generators 116, 120 and the torque transmitting mechanisms 262, 270, 273, 275 in the transmission 112 in response to operator demand.

To reiterate, the transmission 112 is a two-mode, compound-split, electro-mechanical, vehicular transmission. In other words, the output member 124 receives power through two distinct gear trains within the transmission 112. A first mode, or gear train, is selected when the torque-transmitting mechanism 270 is actuated in order to "ground" the outer gear member 246 of the third planetary gear set 228. A second mode, or gear train, is selected when the torque-transmitting mechanism 270 is released and the torque-transmitting mechanism 262 is simultaneously actuated to connect the shaft 260 to the carrier 252 of the third planetary gear set 228.

It should be noted that the first and second "modes" of operation refer to circumstances in which the transmission functions are controlled by one clutch, clutches 262 or 270, and by the controlled speed and torque of the motor/generators 116 and 120. In the embodiment depicted, fixed speed ratios are achievable by applying an additional clutch. This additional clutch may be clutch 262, 273 or 275.

Referring again to FIG. 1, the battery 126 is operatively connected to the motor 104 to selectively supply electrical energy thereto for driving the compressor 92. The controller 130 is operatively connected to the motor 104 to selectively cause the motor 104 to power the compressor 92 when the controller determines that at least one predetermined condition exists. For example, if the engine 14 produces less power than commanded power, i.e., operator demand, one or both of the motor/generators 116, 120 can provide the difference between commanded power and the power supplied by the engine 14, using energy stored in the battery 126.

However, sustained energy draw from the battery 126 by the motor/generators 116, 120 may result in depletion of the stored energy in the battery. Accordingly, if the controller 130 determines that commanded power exceeds engine power for more than a predetermined duration, or if the controller 130 determines that the charge of the battery 126 is less than a predetermined amount, then the controller 130 may cause the motor 104 to operate, thereby operating the compressor 92. The compressor 92 increases the power output of the engine 14 by increasing the charge of air and fuel into the cylinders 22A-F, as understood by those skilled in the art.

When the compressor 92 is not operating, the controller 130 causes the actuator 100 to move the valve 98 to its open position. The second passageway 88 thus acts as a bypass so that the compressor 92 (and its stationary rotor 94) does not restrict the flow of air to the plenum 50. When the motor 104 is powering the compressor 92, the controller 130 causes actuator 100 to move the valve 98 to its closed position to prevent a loss of pressure in the third passageway 96 and intake plenum 50 through the second passageway 88. When the controller 130 causes the motor 104 to stop powering the compressor 92, the controller 130 causes actuator 100 to return valve 98 to its open position.

The controller 130 is also operatively connected to the engine 14 and the transmission 112 to cause various modes of powertrain operation, including engine off idle, electric launch, deceleration fuel cut-off, and regenerative braking, as understood by those skilled in the art. During these modes of operation, the controller 130 causes the fuel injector 110 to be deactivated, i.e., the controller 130 causes the fuel injector 110 not to inject fuel into the air intake system 52, so that the engine 14 is not producing power. It should be noted that, in the preferred embodiment, the crankshaft 30 is continuously operatively connected to the transmission input member 108 without a torque convertor, and therefore the input member 108 and the crankshaft 30 rotate at the same speed. Thus, if the fuel injector 110 is deactivated, but the input member 108 rotates, then the crankshaft 30 will rotate, resulting in air being drawn into the cylinders 22A-F with attendant pumping losses.

The controller 130 is operatively connected to the cam phaser 78 and configured to selectively cause the cam phaser 78 to alter the timing of the intake valve closing event with respect to crank angle. In a preferred embodiment, when the fuel injector 110 is active, the controller 130 causes each intake valve 54A-F to close 80 crank angle degrees after the piston 26A-F in the cylinder 22A-F with which the intake valve 54A-F is associated has reached its respective bottom dead center position. However, during deceleration fuel cut-off, electric launch, and regenerative braking conditions, the controller 130 causes each intake valve 54A-F to close 120 crank angle degrees after the piston 26A-F in the cylinder 22A-F with which the intake valve 54A-F is associated has reached its respective bottom dead center position. By closing the intake valves 54A-F later, less air is pumped through the engine 14, thereby reducing pumping losses during motoring of the engine 14.

During automatic starting and stopping of the engine 14, cylinder compression torque variation may be large and cause objectionable vibrations. The controller 130 is configured to minimize these vibrations by causing the intake valves 54A-F to close 120 crank angle degrees after the corresponding piston 26A-F is at its respective bottom dead center position prior to automatic engine starts and engine stops.

More specifically, the controller 130 is configured to deactivate the fuel injector 110 when at least one predetermined condition exists. Prior to commanding the fuel injector 110 to be deactivated, the controller 130 commands the cam phaser 78 to cause the intake valves 54A-F to close 120 crank angle degrees after the corresponding piston is at its respective bottom dead center position.

The controller 130 is also operatively connected to valve actuators 70B, 70D, 70E, 74B, 74D, 74E to selectively activate and deactivate valves 54B, 54D, 54E, 58B, 58D, 58E. When valves 54B, 54D, 54E, 58B, 58D, 58E are deactivated, engine pumping losses are reduced by increasing the intake manifold pressure (load) at a given output power level.

The electrically variable transmission 112 enables the engine 14 to operate at a higher load over a duty cycle, and the Atkinson cycle improves efficiency at these high load points. The transmission 112 enables the engine 14 to run essentially unthrottled at high load and low speed at most operating points to achieve a low brake specific fuel consumption. The compressor 92 enables the engine 14 operating on the Atkinson cycle, which may normally produce a lower maximum output torque and power for a given cylinder displacement, to produce more power and torque. This enables a greater flexibility in the specification of geometric compression ratio, power stroke expansion ratio, and engine displacement, to further improve efficiency over an Atkinson engine without the compressor 92.

Figure 3:
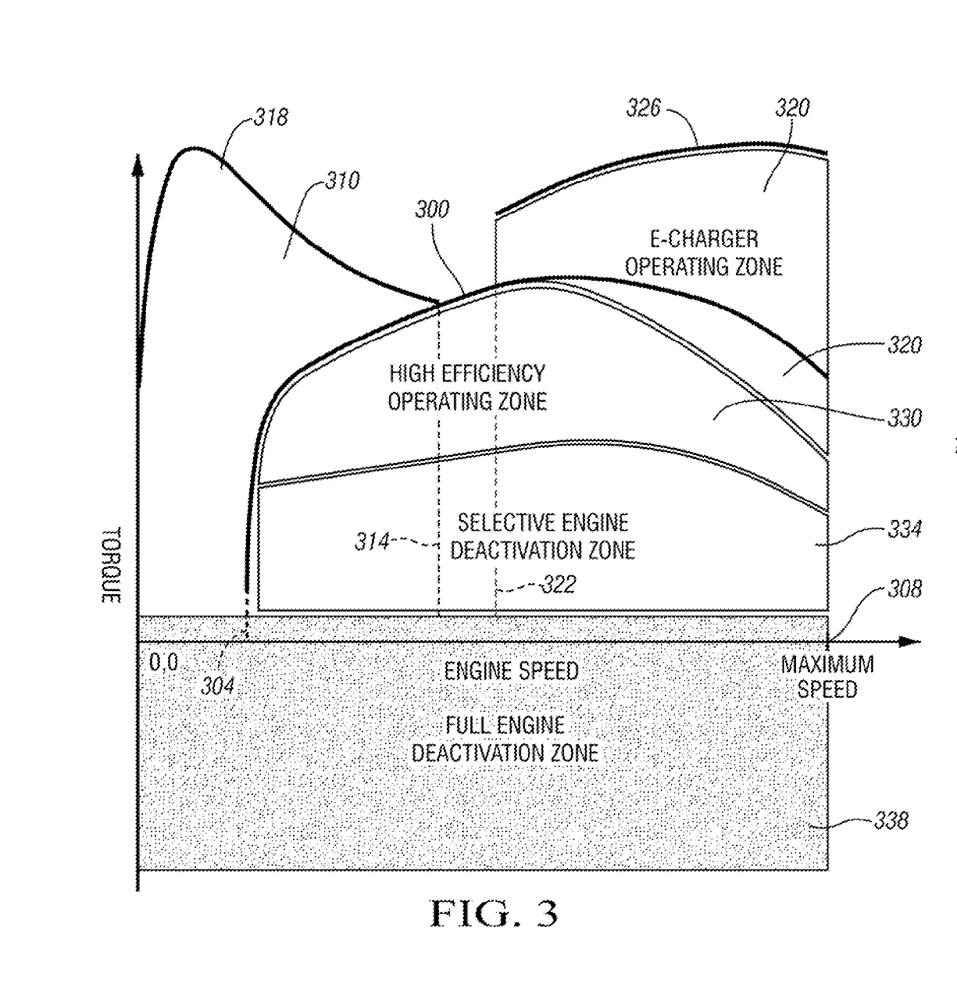
FIG. 3 is an exemplary control map for the powertrain of FIG. 1.

Referring to FIG. 3, a control map for the powertrain 10 is schematically depicted. The control map is an exemplary control logic for the controller 130. The controller 130 is configured to selectively cause five different modes of powertrain operation depending on the engine speed, the commanded torque, and the engine output torque. Referring again to FIG. 1, various sensors 134 are operatively connected to the controller 130. The sensors 134 include a sensor that measures the crankshaft speed, i.e., the angular velocity of the crankshaft 30, and that communicates the crankshaft speed to the controller 130. Sensors 134 also includes one or more sensors that measure engine parameters indicative of output torque, such as intake plenum pressure, mass air flow rate in the air intake system 52, air/fuel ratio, etc., and that communicate these parameters to the controller 130 so that the controller 130 can determine the output torque of the engine 14. Sensors 134 also include sensors that communicate commanded torque to the controller 130; such sensors may include accelerator pedal and brake pedal position sensors.

The controller 130 processes the information received from the sensors 134 according to a predetermined algorithm to determine which of five modes of operation to employ. Referring to FIGS. 1 and 3, line 300 depicts the maximum output torque of the engine 14 between idle speed 304 and the maximum engine speed 308 with the compressor 92 inoperative. In a first operating mode 310, the controller 130 causes at least one of the motor/generators 116, 120 to provide torque and power to the output member 124 of the transmission 112 when the engine speed is less than a first predetermined engine speed 314 and when the commanded torque exceeds the torque provided by the engine 14. Thus, line 318 represents maximum torque of the powertrain 10 provided by the motor/generators 116, 120, the engine 14, or both. The compressor 92 is not active in the first mode 310, i.e., the motor 104 does not transmit power or torque to the rotor 94.

A second operating mode 320 occurs when commanded torque exceeds the maximum torque 300 of the engine 14 for the speed at which the engine is operating, and the engine speed is above a second predetermined speed 322. More specifically, in the second operating mode, the controller 130 causes the battery 126 to supply electrical energy to the motor 104, so that the motor 104 drives the compressor 92 (charger), i.e., the motor 104 transmits power and torque to the rotor 94. Thus, the output of the engine 14 may be increased up to the maximum torque value of the engine 14 with the compressor 92 operating, as represented by line 326. The controller 130 causes the bypass valve 98 to be closed in the second operating mode 320.

The controller 130 causes a third operating mode 330 when the commanded torque is less than the maximum torque output 300 of the engine 14 and greater than one half of the maximum engine torque output 300 for the speed at which the engine 14 is operating. In the third mode, the controller 130 does not supplement the torque with the motor/generators 116, 120 or with the compressor 92. When the commanded torque is less than one half of the maximum engine torque output 300 for the speed at which the engine 14 is operating, then the controller 130 causes a fourth mode of engine operation 334.

In the fourth mode of operation 334, the controller 130 causes the selectively deactivatable valves 54B, 54D, 54E, 58B, 58D, 58E to become deactivated, thereby rendering cylinders 22B, 22D, and 22E inoperative. In the fifth mode of operation 338, the controller disables the fuel injector 110 so that no fuel reaches the cylinders and the engine 14 is deactivated.

In this hybrid system, the boosted Atkinson engine can be used to produce sustained high output power levels, while not depleting the battery 126 of energy. This enables greater maximum vehicle performance for accelerating up a grade with full cargo and passenger loads.

Figure 4:
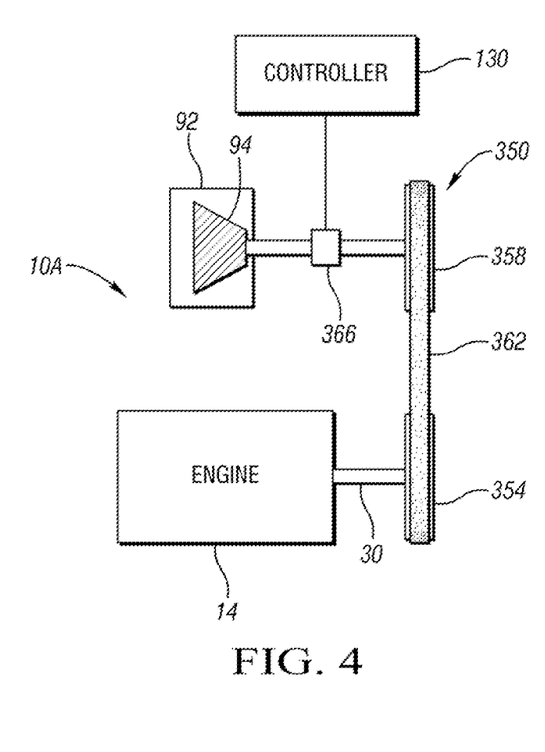
FIG. 4 is a schematic depiction of a portion of an alternative powertrain in accordance with the claimed invention.

Referring to FIG. 4, wherein like reference numbers refer to like components from FIGS. 1 and 1a, a portion of an alternative powertrain 10A in accordance with the claimed invention is schematically depicted. Powertrain 10A is substantially identical to powertrain 10, except that the power source for the compressor 92 is the crankshaft 30 of the engine 14. In the embodiment depicted, a belt drive 350 includes a first pulley 354, a second pulley 358, and a flexible belt 362. The first pulley 354 is rigidly connected to the crankshaft 30 for rotation therewith. The belt 362 operatively interconnects the first pulley 354 and the second pulley 358 to transmit force from the first pulley to the second pulley, as understood by those skilled in the art. Thus, rotation of the crankshaft 30 causes rotation of the second pulley 358.

The powertrain 10A further includes a selectively engageable torque transmitting device 366. Torque transmitting device 366 is a clutch that selectively operatively connects the rotor 94 of the compressor 92 to the second pulley 358 for rotation therewith. Thus, when torque transmitting device 366 is engaged, the rotor 94 is connected to the second pulley 358, and correspondingly, to the first pulley 354 and the crankshaft 30, to receive power and torque therefrom. When the torque transmitting device 366 is not engaged, the rotor 94 is not driven by the crankshaft 30. The controller 130 is operatively connected to the torque transmitting device 366 to control the engagement and disengagement thereof.

It should be noted that, in an embodiment having a hybrid powertrain with a step gear transmission instead of an electrically variable transmission, better fuel economy is achieved by up-shifting rather than holding a lower gear to remain in displacement on demand mode, i.e., operating with valves deactivated.

While the best modes for carrying out the invention have been described in detail, those familiar with the art to which this invention relates will recognize various alternative designs and embodiments for practicing the invention within the scope of the appended claims.

The invention claimed is:

1. A method of operating a powertrain comprising:
   operating the powertrain in a first mode by causing an Atkinson cycle engine and an electric motor to simultaneously transmit torque to an output member;
   operating the powertrain in a second mode by causing the Atkinson cycle engine to transmit torque to the output member and causing a compressor to pressurize air in an air intake system of the engine; and
   operating the powertrain in a third mode by causing the Atkinson cycle engine to transmit torque to the output member with the motor and the compressor inactive.

2. The method of claim 1, wherein the engine includes a cylinder intake valve and a crankshaft; and wherein the method further comprises operating the powertrain in a fourth mode of operation by deactivating the intake valve so that the intake valve remains closed irrespective of crankshaft rotation.

3. The method of claim 2, further comprising operating the powertrain in a fifth mode of operation by causing the motor to transmit torque to the output member without the engine actively providing torque to the output member.

4. A powertrain comprising;
   an Atkinson cycle engine including at least one cylinder, a selectively rotatable crankshaft, and an air intake system that provides selective fluid communication between said at least one cylinder and the atmosphere;
   a motor in hybrid combination with the engine;
   a compressor configured to selectively compress air in the air intake system and having a selectively rotatable rotor;
   a power source operatively connected to the rotor and configured to selectively transmit power to the rotor; and
   a controller operatively connected to the compressor and configured to selectively cause the powertrain to operate in a first mode of operation in which said crankshaft rotates and said power source does not transmit power to said rotor and a second mode of operation in which said crankshaft rotates and said power source transmits power to said rotor.

5. The powertrain of claim 4, wherein said power source is an electric motor operatively connected to said rotor; and wherein said electric motor is controllable by the controller.

6. The powertrain of claim 4, wherein said crankshaft is the power source;
   wherein the powertrain further comprises a torque transmitting mechanism being selectively engageable to transmit torque from the crankshaft to the rotor, and being selectively disengageable to decouple the crankshaft and the rotor.

7. The powertrain of claim 4, further comprising an electrically variable transmission having a transmission input member and a transmission output member; said crankshaft being operatively connected to the transmission input member;
   said motor/generator being part of the electrically variable transmission;
   wherein the transmission is characterized by at least one mode of operation in which the speed ratio between the transmission input member and the transmission output member is selectively variable by varying the speed of said motor.

8. The powertrain of claim 7, wherein the electrically variable transmission is characterized by at least two modes of operation.

9. The powertrain of claim 4, wherein said at least one cylinder includes a first cylinder and a second cylinder; wherein the engine further includes a first intake valve for the first cylinder and a second intake valve for the second cylinder; and wherein the second intake valve is selectively deactivatable.

10. The powertrain of claim 4, wherein the engine includes an intake valve being associated with said at least one cylinder, and a piston within said at least one cylinder for movement between a bottom dead center position and a top dead center position in a compression stroke; and wherein the engine is configured such that the intake valve closes during the compression stroke at least 60 crankshaft angle degrees after the piston is in said bottom dead center position.

11. The powertrain of claim 10, further comprising a cam phaser configured to selectively change the crankshaft angle at which the intake valve closes.

12. The powertrain of claim 11, wherein the engine includes at least one fuel injector and a controller;
   wherein said controller is operatively connected to the fuel injector and configured to selectively activate and deactivate the fuel injector;
   wherein said controller is operatively connected to the cam phaser to control the timing of the opening and closing of the intake valve;
   wherein the controller is configured to cause the intake valve to close at a first crankshaft angle after said bottom dead center position of the piston during a compression stroke when the fuel injector is activated; and wherein the controller is configured to cause the intake valve to close at a second crankshaft angle greater than the first crankshaft angle after said bottom dead center position of the piston during a compression stroke when the fuel injector is deactivated.

13. The powertrain of claim 4, wherein the air intake system defines a first passageway and a second passageway that provide selective fluid communication between the atmosphere and said at least one cylinder;
   wherein said compressor is configured to compress air in the second passageway;
   wherein the powertrain further comprises a valve being selectively movable between an open position in which the valve does not obstruct the first passageway and a closed position in which the valve obstructs the first passageway; and
   wherein the controller is operatively connected to the valve and configured to cause the valve to be in the closed position when the powertrain is in the second mode of operation and to be in the open position when the powertrain is in the first mode of operation.

* * * * *